May 12, 1970 J. MERCIER 3,511,280
PRESSURE VESSEL
Filed Dec. 13, 1967 3 Sheets-Sheet 1

INVENTOR
JEAN MERCIER
BY
ATTORNEY

May 12, 1970 J. MERCIER 3,511,280
PRESSURE VESSEL
Filed Dec. 13, 1967 3 Sheets-Sheet 3

INVENTOR
JEAN MERCIER
BY
ATTORNEY

United States Patent Office 3,511,280
Patented May 12, 1970

3,511,280
PRESSURE VESSEL
Jean Mercier, 501 Bloomfield, Caldwell, N.J. 07006
Filed Dec. 13, 1967, Ser. No. 690,181
Claims priority, application France, Dec. 23, 1966, 88,609
Int. Cl. F16l 55/04
U.S. Cl. 138—30                                                   20 Claims

ABSTRACT OF THE DISCLOSURE

This invention relates to a pressure vessel, more particularly a rigid container having a deformable bladder therein to define two chambers in said container for two fluids under pressure. One of said chambers has an outlet port and the bladder carries a valve member designed to seat on said outlet port to close the latter. A pair of coaxial spring portions are associated with the valve member and are designed to exert substantially equal torque in opposed directions respectively as the valve member moves between open and closed position to restrain twisting of said valve member and the bladder to which it is connected.

---

As conducive to an understanding of the invention, it is noted that in pressure vessels of the type comprising a rigid container having a port at each end with a deformable partition in the form of a bladder intervening between the ports and defining two chambers, where the free end of the bladder carries a valve member designed to move against a seat defined by one of said ports to close the latter in order to prevent extrusion of the bladder when there is a rapid flow of fluid through the port, the valve member may prematurely seat before all of the fluid is discharged, with resultant inefficiency thereof.

Where, to overcome this problem, a resilient unit and particularly an elongated coil spring is positioned in said bladder and is connected at one end to the valve member and at its other end to the container, although such coil spring may prevent premature closing of the valve member, due to the fact that a conventional coil spring tends to twist in one direction when elongated and in the opposed direction when it is permitted to retain its original length, a corresponding twisting action will be imparted to the valve member and to the end of the bladder to which it is secured. Such twisting action causes fatigue of the bladder and shearing effect of the valve member with respect to the portion of the bladder to which it is connected, with resultant likelihood of failure of the unit.

It is accordingly among the objects of the invention to provide a pressure vessel of the above type in which the valve member will be restrained from premature closing by the use of a resilient unit, yet in which the valve member and the bladder will have substantially no twisting action imparted thereto as the valve member moves toward and away from its seat.

According to the invention, these objects are accomplished by the arrangement and combination of elements hereinafter described and more particularly recited in the claims.

Figure 1:
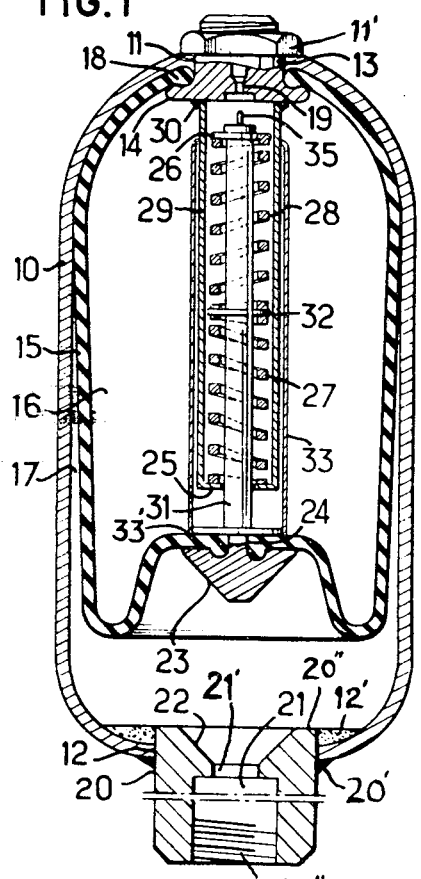
Figure 2:
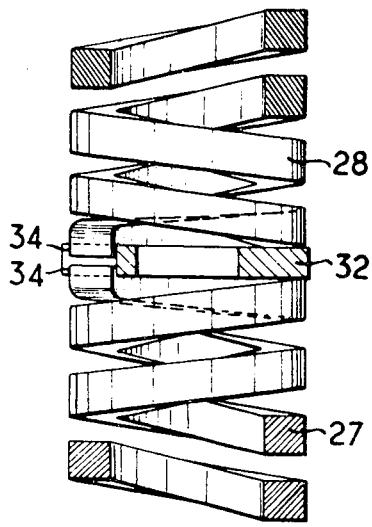
Figure 3:
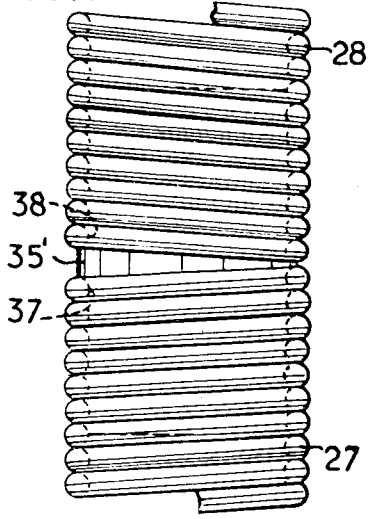
Figure 4:
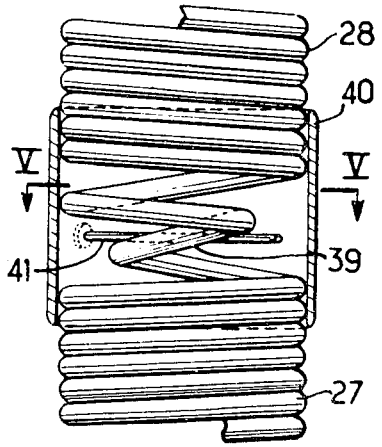
Figure 5:
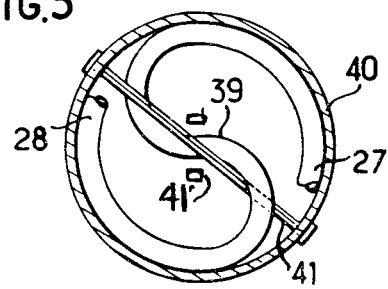
Figure 6:
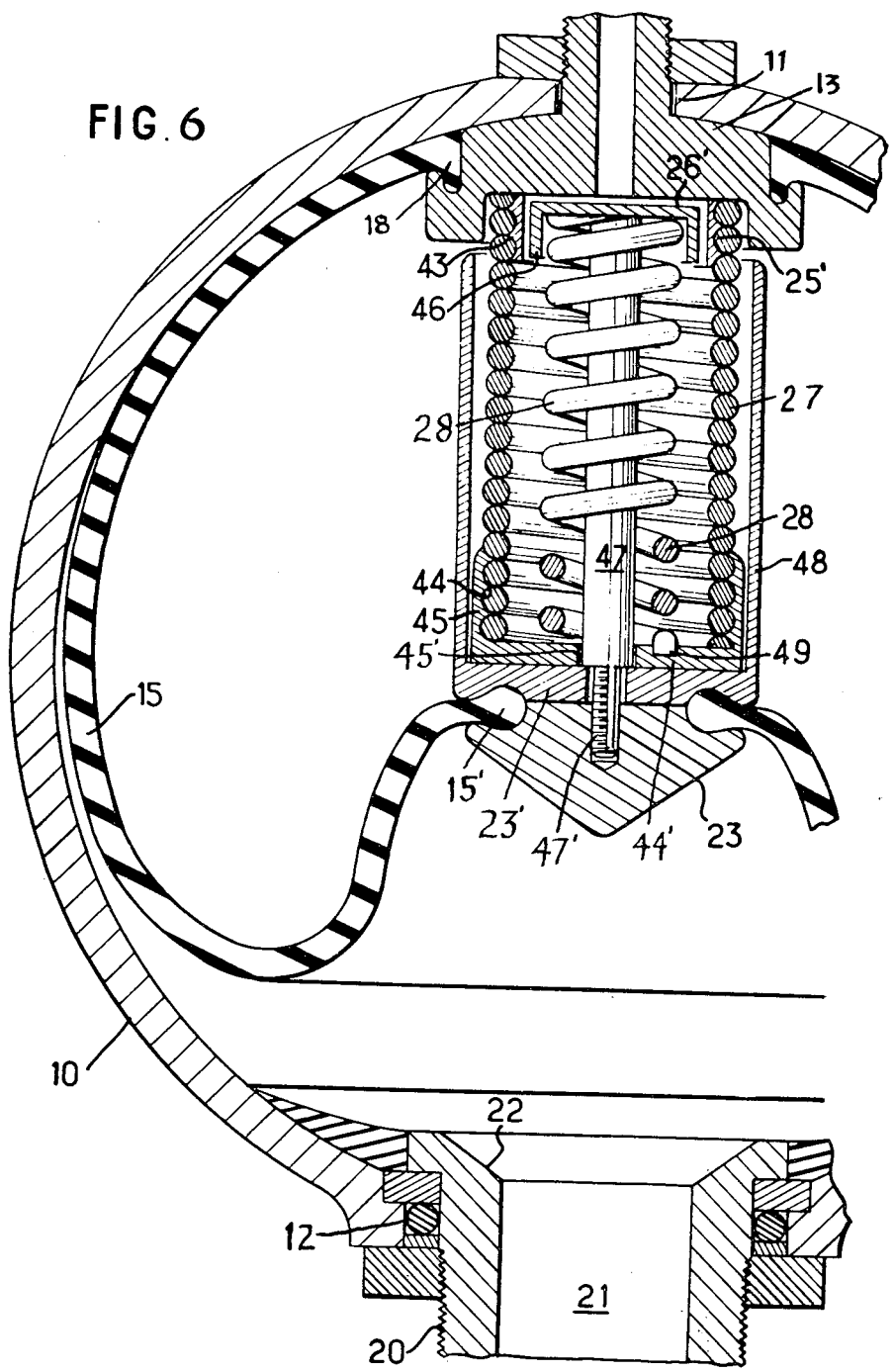
Figure 7:
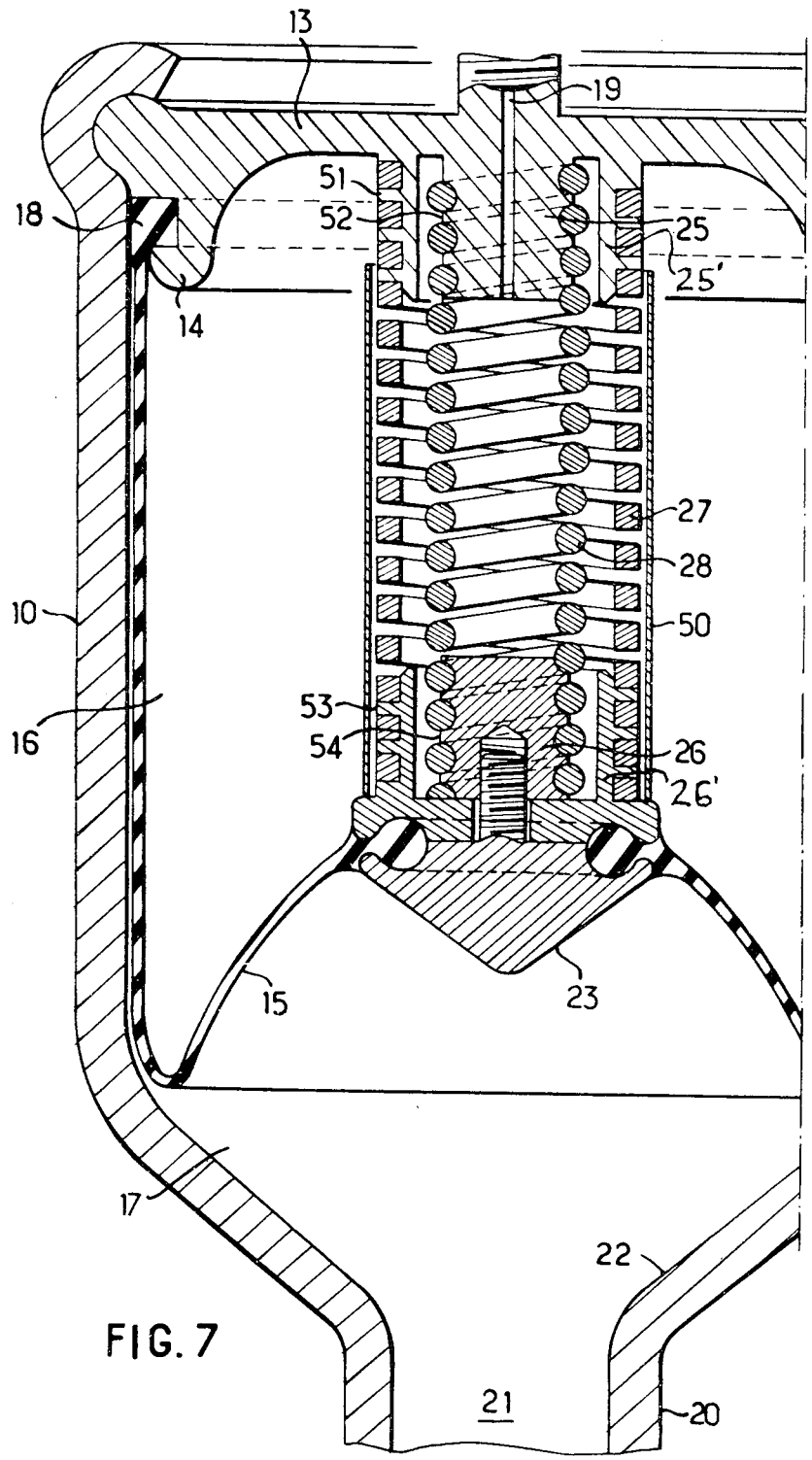

In the accompanying drawings in which are shown one or more of various possible embodiments of the several features of the invention;

FIG. 1 is a longitudinal sectional view of a pressure vessel according to one embodiment of the invention, FIG. 2 is a fragmentary perspective view partly in cross section and on a larger scale showing the resilient unit of FIG. 1, FIGS. 3 and 4 are perspective views of other embodiments of the resilient unit, FIG. 5 is a transverse sectional view taken along V—V of FIG. 4, and FIGS. 6 and 7 are longitudinal sectional views with parts broken away of two other embodiments of the invention.

Referring now to the drawings, in the illustrative embodiment shown in FIG. 1, the pressure vessel is illustratively a pressure accumulator, comprising a container 10 substantially cylindro-spherical in shape and of strong rigid material capable of withstanding high pressures, said container 10 having axially aligned openings 11 and 12 at its opposed ends.

Mounted in opening 11 is a plug 13 having a lateral flange 14 with an annular depression therein to receive the thickened rim 18 of the mouth of a deformable separator 15. The separator 15 divides the interior of the container 10 into a compartment 16 for one fluid, illustratively a gas, and a compartment 17 for a second fluid, for example a liquid.

As shown in FIG. 1, the separator 15 comprises a bladder of flexible material, the thickened rim 18 at the mouth of which is held tightly between the flange 14 and the wall of the container 10 when a nut 11' screwed on the threaded end of plug 13 extending beyond opening 11, is tightened. The plug 13 has an axial passage 19 with a suitable air valve (not shown) for inflating the bladder 15 with gas under pressure.

Mounted in the opening 12 is a tubular member or sleeve 20 which is illustratively secured in said opening as by welding at 20'. Preferably, a filler 12', which may be of resilient material, encompasses the portion of the tubular member 20 extending into the container and is flush with the inner end 20" of said tubular member 20.

The bore of tubular member 20, which defines the fluid outlet port 21 of the unit, is of reduced diameter as at 21' adjacent its inner end and said bore 21 is internally threaded at its outer end 21", to receive the correspondingly threaded end of a coupling (not shown) to which a hydraulic line may be connected.

The portion of the bore 21 between the reduced diameter portion 21' and the inner end 20" of the tubular mmeber 20, is flared as at 22 to define a seat to receive a substantially conical valve head 23 to control flow of fluid through said bore 21 into and out of the container 10.

The valve head 23 is secured to the end of the bladder 15 opposed to the mouth 18 thereof. It will be noted that in the intermediate open position shown in FIG. 1, the valve member 23 is separated by a relatively considerable distance from the seat 22 to provide a relatively large stroke of movement of said valve member.

Secured to the relatively flat inner end of said valve head 23 and extending axially thereof into said bladder 15, is a stem 31 which has a collar 26 secured to its inner end. In addition, the inner end of the stem 31 has a nipple 35 extending axially outward therefrom, the function of which will hereinafter be described.

Means are provided to control the displacement of the valve head 23 with respect to its seat 22 and also to control deformation of the bladder 15, such as any twisting action imparted thereto.

According to the invention, such means comprises a resilient unit comprising two coaxial helicoidal springs 27 and 28, positioned to provide equal torque effects in opposite directions, said springs reacting one with the other so as substantially to compensate for the torsional stresses occurred when the valve head 23 is displaced with respect to its seat 22.

As shown in FIG. 1, a sleeve or tube 29 is provided, which is secured as at 30 to the undersurface of the plug 13, and extends axially into the container, the other end of the tube 29 having an inwardly extending supporting flange 25. Encompassing the tube 29 is a second sleeve or tube 33, which is secured at one end as at 33' with respect to the valve head 23 and is of length substantially the length of the tube 29, being slightly spaced therefrom. The springs 27, 28 encompass the stem 31 and are positioned inside the tube 29. More particularly, the springs 27, 28 are separate and distinct from each other and are longitudinally aligned, being separated by a collar or washer 32 freely encompassing the stem 31, said springs being secured at their inner ends as at 34 to said washer 32, as is shown in FIG. 2 for example.

The spring 27, which illustratively is a right handed spring, acts between the fixed support or flange 25 and the washer 32, whereas the spring 28 which is a left handed spring, acts between the washer 32 and the collar 26 carried by the stem 31.

Clearly, the springs 27, 28 act axially as far as compression is concerned, and act in opposed directions as far as rotary action or torque is concerned.

In the operation of the accumulator, the bladder 15 may first be charged with gas under pressure through passageway 19, which is then sealed by a suitable valve (not shown). The charging of the bladder will cause expansion thereof which will overcome the tension of the two coil springs 27, 28 so that the valve head 23 may move onto the seat 22 to close the port 21.

A fluid such as oil under pressure greater than that of the gas in bladder 15 is then forced through the port 21. The flow of oil through port 21 will move the valve head 23 off its seat 22 into the container 10 so that such oil may enter the latter to deform the bladder, further to compress the gas therein.

The inward movement of the valve head 23 is limited by the abutment of the collar 26 against the plug 13 which defines a fully open position of the valve head 23. A dashpot action is effected at the end of the inward movement of the valve head by reason of the interaction of the nipple 35 with the recess defined at the inner end of passage 19. When the container 10 has been fully charged, a valve (not shown) controlling the port 21 is closed and the unit is ready for use.

It is to be noted that by reason of the sleeve 33 encompassing the sleeve 29, pinching of the compressed bladder say, between the stem 31 and the flange 25 is precluded. Furthermore, the sleeve 33 which encompasses the sleeve 29 provides an appreciable dashpot effect.

It is further to be noted that by reason of the coaction of the sleeves 29 and 33 and the positioning of the stem 31, the deformed bladder will be retained in substantially the center of the container 10 so that the likelihood of rubbing of the bladder against the wall of the container is minimized.

When the valve (not shown) controlling the port 21 is opened, as a result of expansion of the gas in the bladder, oil will be forced through the port 21 and with continued expansion of the bladder it will finally exert sufficient force to overcome the resistance of springs 27, 28 so that plug 23 will finally seat on the surface 22 of member 20 to close the port 21.

It is to be noted that the springs 27, 28 will be compressed axially as the valve head 23 moves toward closed position and will extend axially as the valve head moves away from the seat 22.

Where a conventional elongated coil spring is used, it tends to twist in one direction when elongated and twist in the opposite direction when it is permitted to regain its original length. As the result of such twisting action, the valve head 23 and the bladder 15 would also tend to twist. Since the upper portion of the bladder would be pressing against the wall of the container before the lower portion of the bladder, the fatigue and shearing effect resulting from such twisting action imparted to the valve head by a conventional coil spring would be practically localized at the lower part of the bladder and such fatigue and shearing effect could rapidly cause breakdown and failure of the bladder.

This problem is eliminated by the invention herein by reason of the fact that the resilient means is a composite unit comprising two conventional spring portions twisting in opposite directions and hence the twisting action is totally neutralized.

As shown in FIGS. 1 and 2, the wire from which the springs 27, 28 are formed is rectangular in cross section.

In the embodiment shown in FIG. 3, the wire from which the springs 27, 28 are formed is illustratively circular in cross section and the springs are joined together by means of a washer 35' having a central opening through which the stem 31 freely extends, said washer 35' having suitable helical grooves or threads 37, 28 extending in opposed directions onto which the ends of the springs are screwed.

The embodiment shown in FIGS. 1 and 2 employing the washer 32 is preferable for the interaction in torque of two springs which act axially in compression. The wedge 35' shown in FIG. 3 can be used both in such case and also where the springs act in traction.

In the embodiment shown in FIGS. 4 and 5, the two springs 27, 28 are formed from a single spring member having one portion 27 with a right handed turn and the second portion 28 with a left handed turn, these two portions being joined by a loop 39 in the form of an S. At the region where the loop 39 is located, the springs 27, 28 are encompassed by a protective sleeve 40 held in position by a diametrical pin 41.

In the embodiment of the spring unit shown in FIGS. 4 and 5, since the pin 41 would interfere with the movement of the stem 31, the stem is provided with a slotted portion 41' to permit free movement of the pin and spring with respect to the stem.

In the embodiment shown in FIG. 6, the pressure vessel or container 10 is illustratively spherical and has opposed openings 11 and 12. A bladder 15 is secured in position with respect to opening 11 by a plug 13 in the manner similar to the retention of the bladder 15 of FIG. 1. The opening 12 has a sleeve member 20 secured therein, the inner end of which defines a beveled valve seat 22, the bore 21 of said sleeve 20 defining the fluid port.

A valve head 23 designed to seat on the beveled seat 22 is secured to the end of the bladder 15 opposed to the mouth 18 thereof. As shown in FIG. 6 the bladder 15 has an opening at such end with a thickened rim 15' which is clamped against the top surface of the valve head by a plate 23'. To effect such clamping action, a stem 47 is provided which has a threaded end 47' screwed into a corresponding threaded opening in the valve head 23 and having an annular shoulder which serves to clamp the plate 23' against the valve head.

The plate 23' forms the floor of a cylindrical tube or sleeve 48 which extends axially in the container encompassing the stem 47, said sleeve 48 moving with said stem.

As is shown in FIG. 6, the plug 13 has an annular recess therein and a threaded nipple 25' is positioned in said recesses and secured at one end to the floor thereof, said threaded sleeve being of diameter less than that of the recess.

Positioned in the sleeve 48 is a coil spring 27 which illustratively is wound in a right handed direction and is screwed at its upper end onto the threaded outer portion of the nipple 25' so as to be securely retained thereto. The other end of the spring 27 is screwed into the internally threaded wall 44 of a cup 45, the latter having an opening 45' in the floor 44' thereof through which the stem 47 freely extends. Also encompassing the stem 47 is a second coil spring 28 which is also wound in a right handed direction and is of smaller diameter than the spring 27 and encompassed thereby. One end of the spring 28 is secured to the floor 44' of cup 25 as at 49. The other end of the spring 28 reacts against an inverted cup-shaped member 26' which is secured to the free end of stem 47 to move in unison therewith.

In the embodiment shown in FIG. 6, when the valve head 23 moves downwardly from the position shown, the spring 27 extends and the spring 28 is compressed so that said spring portion acts in series.

When the valve head 23 moves upwardly from its seat 22, the spring 27 will contract until its convolutions are in engagement and the spring 28 will extend so that said spring portions also act in series.

As the two springs 27, 28 are selected so that their twisting effects are substantially identical and opposed, any annular movement of the cup-shaped member 45 resulting from the twisting effect of the outer spring 27 is compensated by the inner spring 28 and vice-versa and hence the valve head 23 and the bladder 15 will not be subjected to fatigue or shearing action.

In the embodiment shown in FIG. 7, the pressure vessel 10 has an open upper end which is normally closed by a cover plate 13 which also is conformed to retain the mouth 18 of the bladder in fixed position. In this embodiment the bladder is of substantially non-extensible material, for example, it may be made of polyvinyl chloride.

As shown in FIG. 7, a valve head 23 is secured to the end of the bladder remote from the mouth 18 thereof. The valve head has an axial stud 26 secured thereto and extending inwardly thereof which is externally threaded as shown and which is encompassed by a nipple 26' illustratively formed integrally with the valve head. The cover member 13 has an axial, inwardly extending stud 25 with a central opening 19 therethrough and said stud is externally threaded as shown. A coil spring 28 wound, for example, in a left handed direction, has one end screwed on the stud 25 and its other end screwed on the stud 26.

A nipple 25', preferably formed integrally with the cover member 13 and extending inwardly thereof, encompasses the stud 25 and is externally threaded to receive one end of a coil spring 27. The other end of said coil spring 27 is screwed on the externally threaded outer surface of the nipple 26', said spring 27 being wound in a right handed direction.

Desirably, a cover sleeve 50 is provided, secured at one end to the valve head as shown and extending axially toward the cover member 13.

In the embodiment shown in FIG 7, the springs 27, 28 both tend normally to urge the valve head away from its seat 22, i.e., to urge the valve head 23 to open position.

As shown in FIG. 7, the springs 27, 28 consist of separated spirals and hence can work either in compression or in traction. Assuming that in the position shown in FIG. 7, the springs are in the neutral position, when the bladder is charged with gas under pressure, it will expand and hence the valve head 23 will be moved against the seat 22 against the force exerted by the now stressed coil springs. When oil under pressure is forced through the port 21, the coil springs 27, 28 will exert pull on the bladder thus assisting in the movement of the valve head 23 away from its seat. As fluid under pressure is forced into the container, as soon as the coil springs reach the position shown in FIG. 7, i.e., their neutral position, further inward movement of the valve head 23 will be restrained or dampened by reason of the fact that the coil springs will now be under compression.

It is to be noted that since the coil springs 27, 28 are wound in opposed direction, they will tend to restrain any tendency of the valve head 23 or bladder 15 to twist in either direction.

With the constructions above described, it is apparent that the valve member 23 will be restrained from premature closing yet twisting of the valve member and the bladder during movement of the valve member between open and closed position will be substantially precluded.

Although the resilient unit, according to the invention herein, is highly important when the bladder is of resilient material such as rubber or synthetic plastic of like physical characteristics, it is even more important when the bladder is of substantially non-stretchable material.

As many changes could be made in the above constructions and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid container having a deformable bladder therein, the area of said bladder wall substantially conforming to the area of the inner wall surface of said container when the bladder is in extended condition, said bladder having a mouth at one end, means securely clamping said mouth with respect to said container, means to charge said bladder with fluid, said container having an opening axially aligned with said bladder for flow of a second fluid into and out of said container, said opening defining a valve seat, valve means in said container secured to the end of the bladder remote from the mouth thereof and adapted to move against said seat, resilient means in said container operatively connected to said valve means, normally to retain said valve means in open position, said resilient means comprising two coaxial helical spring portions adapted to exert torque in opposite directions to prevent twisting movement of said valve means and said bladder as said valve means is moved toward and away from said seat.

2. The combination set forth in claim 1 in which said spring portions are longitudinally aligned, with adjacent ends thereof being secured with respect to each other.

3. The combination set forth in claim 1 in which the convolutions of the coils of each of said spring portions are spaced.

4. The combinations set forth in claim 1 in which one of said spring portions encompasses the other spring portion.

5. The combination set forth in claim 1 in which said spring portions are designed to exert substantially equal torque in opposite directions.

6. The combination set forth in claim 1 in which a sleeve is secured at one end to said container and extends axially thereof into said bladder, said sleeve having an abutment at its inner end, a stem is secured at one end with respect to said valve member and extends axially thereof into said sleeve, said stem having an abutment at its free end, said spring portions being longitudinally aligned and encompassing said stem, adjacent inner ends of said spring portions being secured with respect to each other, said spring portions being wound respectively in opposite directions and having their outer ends engaging said abutments.

7. The combination set forth in claim 6 in which a second sleeve is provided encompassing said first sleeve and slightly spaced therefrom, said second sleeve being secured at one end with respect to said valve member so as to move in unison therewith.

8. The combination set forth in claim 1 in which said spring portions are longitudinally aligned, a collar is interposed between adjacent inner ends of said spring portions and said adjacent inner ends are secured respectively to said collar.

9. The combination set forth in claim 8 in which said collar has peripheral helical grooves extending in opposed directions to receive the adjacent inner ends of said spring portions.

10. The combination set forth in claim 1 in which said two spring portions are formed from a single elongated member having its end portions wound in opposite directions.

11. The combination set forth in claim 10 in which the mid portion of said elongated member is encompassed by a sleeve secured thereto.

12. The combination set forth in claim 1 in which a stem is rigidly affixed at one end with respect to said valve member and extends axially thereof into said bladder, said stem having an abutment at its other end, one of said spring portions encompassing said stem and having one end adapted to react against said abutment and its other end adapted to operatively react against said valve member, said second spring portion encompassing said first spring portion and having one end secured in fixed position with respect to the end of said container to which the bladder is secured, and its other end adapted to react against said valve member.

13. The combination set forth in claim 12 in which a sleeve encompasses said spring portions and is secured at one end to said valve member to move in unison therewith.

14. The combination set forth in claim 1 in which a stem is rigidly affixed at one end with respect to said valve member and extends axially thereof into said bladder, said stem having an abutment at its other end, a cup-shaped member having a floor with an axial opening therein is slidably mounted with respect to said stem, one of said spring portions encompassing said stem and having one end adapted to react against said abutment and its other end secured to the floor of said cup-shaped member, said second spring portion encompassing said first spring portion and having one end secured to the wall of said cup-shaped member and its other end secured with respect to the end of the container to which the bladder is mounted.

15. The combination set forth in claim 14 in which said first spring portion has the convolutions of its coils spaced from each other when the spring portion is in neutral position and the second spring portion has the convolutions of its coils in engagement with each other when said second spring portion is in neutral position, whereby said first spring portion will be compressed and the second spring portion will be extended when the valve member is moved from open position to closed position against said seat.

16. The combination set forth in claim 15 in which said spring portions are wound in the same direction.

17. The combination set forth in claim 1 in which said valve member has an axial stud extending inwardly therefrom into said bladder, a nipple secured at one end with respect to said valve member encompasses said stud, a second stud rigid with the end of the container to which the bladder is secured extends inwardly from such end and axially aligned with said first stud and longitudinally spaced therefrom, a second nipple encompasses said second stud and is secured at one end to the end of the container to which said bladder is secured, the first of said spring portions being secured at its respective ends to said respective studs and the other of said spring portions being secured at its respective ends to the respective nipples.

18. The combination set forth in claim 17 in which said two spring portions have their convolutions in spaced relationship when said spring portions are in neutral position with said valve member spaced from said seat.

19. The combination set forth in claim 17 in which a sleeve encompasses both of said spring portions and is secured at one end in fixed position with respect to said valve member to move axially therewith.

20. The combination set forth in claim 17 in which said spring portions are wound in opposite direction.

References Cited

UNITED STATES PATENTS

| | | | |
|---|---|---|---|
| 1,472,782 | 11/1923 | Barber. | |
| 2,947,326 | 8/1960 | Mercier | 138—30 |
| 3,066,700 | 12/1962 | Mercier | 138—30 |
| 3,209,785 | 10/1965 | Mercier | 138—30 |
| 3,273,596 | 9/1966 | Beckett | 138—30 |
| 3,298,337 | 1/1967 | Thompson | 267—1 X |

LEVERNE D. GEIGER, Primary Examiner

J. S. MEDNICK, Assistant Examiner

U.S. Cl. X.R.

267—1